United States Patent Office 3,555,409
Patented Jan. 12, 1971

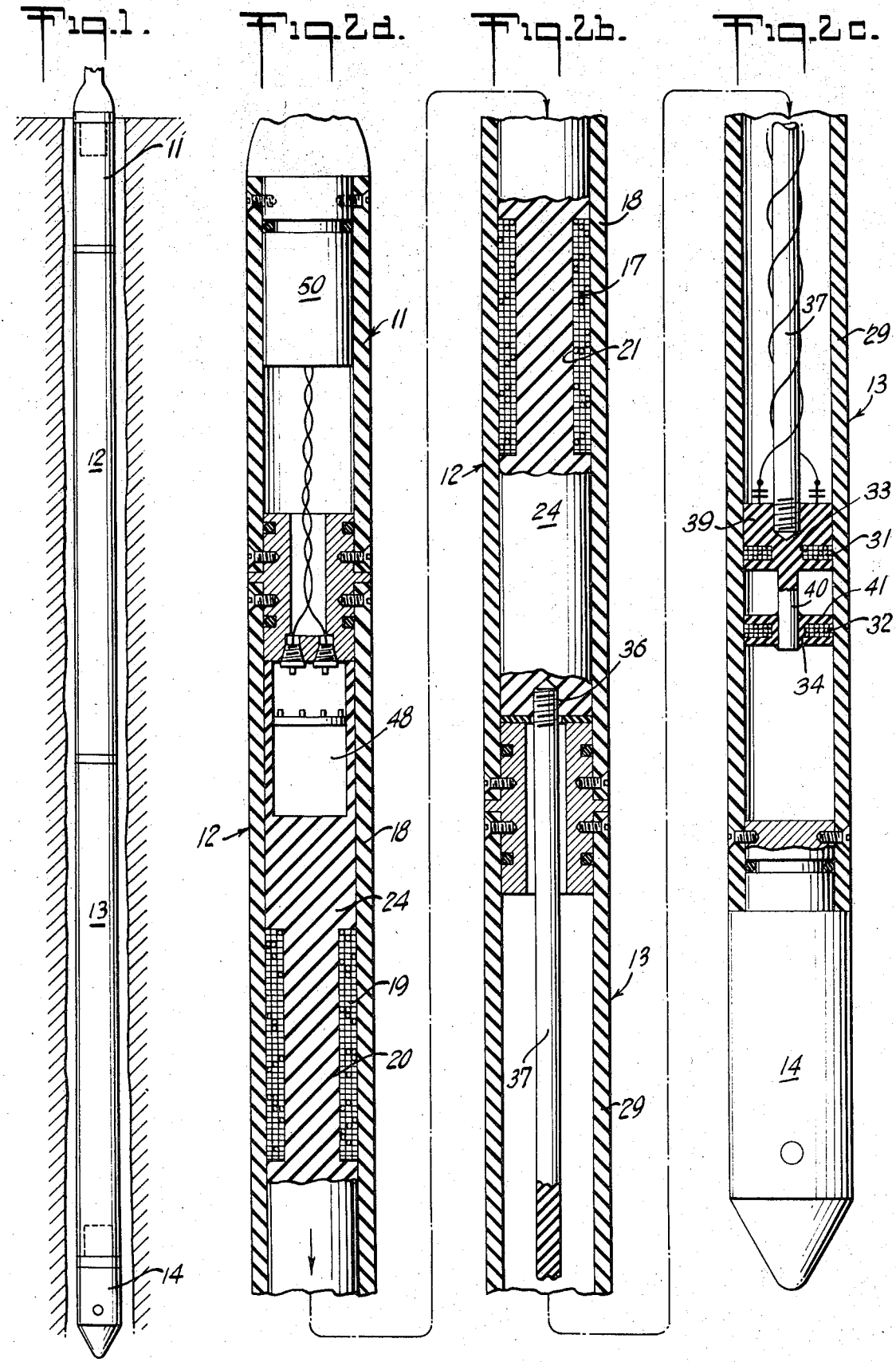

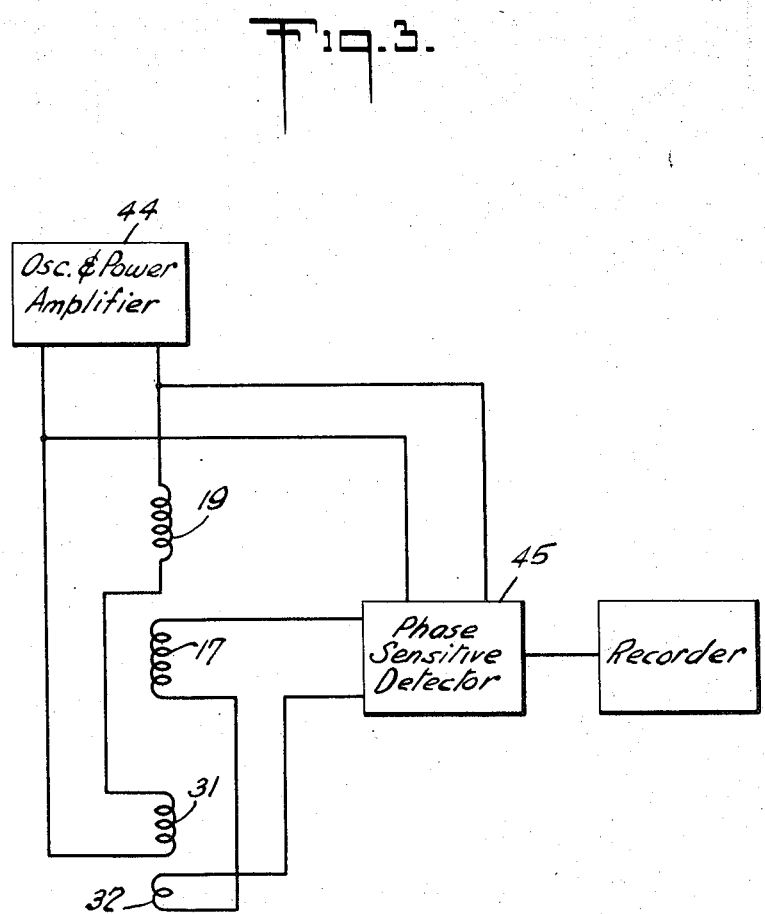

3,555,409
MAGNETIC SUSCEPTIBILITY LOGGING SYSTEM WITH TRANSMITTER AND RECEIVER NULL COILS
George R. Atwood, 6614 Birdwood, Houston, Tex. 77036, and Donald J. Dowling, Houston, Tex. (% Texaco, Inc., P.O. Box 425, Bellaire, Tex. 77401)
Continuation of application Ser. No. 685,113, Nov. 22, 1967. This application Oct. 6, 1969, Ser. No. 866,092
Int. Cl. G01v 3/10
U.S. Cl. 324—6     5 Claims

ABSTRACT OF THE DISCLOSURE

A borehole logging tool that includes air core transmitter and receiver coils plus auxiliary air core nulling coils. A compensated magnetic induction circuit is employed for nulling a major portion of the receiver coil signals, in order that the changes caused by magnetic property change in the surrounding borehole, may be readily detected. The auxiliary nulling coils are pancake shaped and are located outside the fields of the transmitter and receiver coils. But they are located on the logging tool so that they are subject to the same ambient conditions as are the transmitter and receiver coils.

BACKGROUND OF THE INVENTION

This is a continuation of Ser. No. 685,113, filed Nov. 22, 1967, now abandoned.

Field of the invention

This invention relates to borehole logging tools generally and more specifically applies to such tools that are employed for determining magnetic properties, particularly magnetic susceptibility, of the surrounding borehole.

Description of the prior art

It has long been recognized that it would be profitable to determine magnetic properties, e.g., magnetic susceptibility of the surrounding borehole material throughout the length of a borehole. This is in connection with oil and gas wells particularly. However, prior arrangements have run into various proplems and difficulties.

Among the difficulties have been those related to the approach that employed a magnetically permeable core solenoid connected into an electrical bridge configuration. That arrangement was found quite unsatisfactory because it was extremely temperature sensitive. Furthermore, even where attempts were made to enclose the instrument in an insulated structure, such as a Dewar flask, it was found that the core was subject to incremental permeability changes due to external fields including the earth's field. In addition, even where a special material was employed for the permeable core in order to overcome some of those variables, it was discovered that such material was subject to very unstable properties due to handling.

There is other prior art, dealing with the field of magnetic logging, which discloses tools having a plurality of coils. Often these have been connected in bridge-like circuits. However, much of such prior art was concerned with various so-called "focusing" effects for applying changes in the geometry of the magnetic fields for the transmitter-receiver coil arrangement. The purpose of such structure and arrangements was to cause a flattened magnetic field shape, or otherwise provide for a shortening of the effective field (taken axially along the borehole). In that way, the purpose was to be able to detect changes in magnetic porperties that occur only over a relatively short distance axially along the borehole.

While the applicant's invention might conceivably make use of some focusing arrangements in conjunction with their invention, there is no applicability of the focusing structures per se to the applicant's invention, nor are focusing arrangements per se in any way pertinent or relevant to the applicant's invention.

SUMMARY OF THE INVENTION

It is an object of this invention to disclose a system that provides the ability to eliminate the effects of ambient temperature changes and incremental magnetic field changes such as may be due to the earth's field, while at the same time allowing for the measurement of magnetic susceptibility properties of surrounding borehole material.

Another object of the invention is to provide borehole logging apparatus that is an improvement over known arrangements for measuring magnetic susceptibility of borehole material. The invention makes use of air core transmitter and receiver coils, along with nulling coils that are also air core and are located outside the effective fields of the transmitter-receiver pair. Still another object of the invention is to construct the foregoing nulling coils shaped in a pancake-like configuration. Consequently, due to the geometry of these coils, the surrounding magnetic susceptibility properties of the borehole walls will not effectively cause any signal changes in the nulling coils themselves.

BRIEF DESCRIPTION OF THE DRAWINGS

The foregoing and other objects and benefits of the invention will be more fully set forth below in connection with the best mode contempltaed by the inventors of carrying out the invention and in connection with which there are illustrations provided in the drawings, wherein:

FIG. 1 is a schematic illustrating an instrument according to the invention shown located within a borehole and indicating the rather substantial length of the tool;

FIG. 2 is an enlarged schematic broken into three parts parts (FIG. 2a, FIG. 2b, and FIG. 2c) and largely in cross-section, that illustrates the internal details and structural elements of the logging tool; and FIG. 3 is an electrical circuit diagram illustrating the connections between the various coils of the logging instrument, and indicating by block diagram other electrical elements.

DESCRIPTION OF THE PREFERRED EMBODIMENT

Referring first to FIG. 1 it will be noted that the logging instrument is made up of an upper "head," or connection portion 11, that is joined successively to two intermediate body sections 12 and 13. Finally, there is a lower plug or tip portion 14.

At the top of the head portion 11 there may be any desirable structure (only schematically suggested) that will have a suspension cable (not shown) attached thereto for supporting the logging tool. All of the body sections 11–14 of the tool are constructed of non-magnetic material in order to avoid effecting the magnetic properties of the formation.

In FIG. 2 it will be noted that the upper body section 12 is partly shown in FIG. 2a and partly at the top portion of FIG. 2b. There is an outer cylindrical case 18 that protectively surrounds a search transmitter coil 19 and a search receiver coil 17. These are wound on reduced diameter portions 20 and 21, respectively, of a coil form 24 that is surrounded by the case 18. There may be longitudinal slots (not shown) cut in the surface of the coil form along the large diameter portions, for carrying the necessary electrical circuit wires therein.

Attached below the case 18, there is a similar case 29 that continues on down and houses therein a pair of null coils 31 and 32. These are flat, pancake-shaped coils wound in bobbin-like reduced diameter grooves 33 and 34 respectively.

It will be observed that by reason of the relatively short longitudinal extent of the windings of the null coils 31 and 32, they will have concentrated magnetic fields related thereto which may mutually interact, but which will not be effected to any substantial extent by the magnetic properties of the surrounding borehole walls. This is in distinction to the main search transmitter and search receiver coils 19 and 17 respectively which have relatively extensive longitudinal dimensions. These latter coils are placed sufficiently spaced apart so that the magnetic fields may interact, with a desired amount of penetration thereof laterally so as to reach into the borehole walls and thus be effected by the magnetic properties thereof.

The null coils 31 and 32 and their supporting bobbins or grooves 33 and 34, are mounted at the lower end of a rod 37. Rod 37 is attached into the lower end of the coil form 24 in any feasible manner, e.g. by being threadably engaged in a tapped hole 36 axially located in the coil form 24. The other end of the rod 37 has similarly attached to it an insulating material bobbin head 39 which incorporates the bobbin groove 33 therein, and has a short shaft 40 extending axially for accommodating a bobbin 41 that has the groove 34 therein. The bobbin 41 is slid onto the shaft a predetermined distance away from the bobbin groove 33 and then is secured in place, e.g. by having an epoxy glue applied.

It is to be noted that the rod 37 is made long enough so as to place the null coils 31 and 32 substantially outside of any magnetic field, or fields, created by one or both of the search transmitter and search receiver coils. In this manner, the magnetic susceptibility of the borehole walls may be measured by the change in interaction from these transmitter and receiver coils while at the same time the ambient temperature and the earth's magnetism and the like, may be compensated for. This is true because the latter effects will equally introduce variables in the null coils 31 and 32 which are connected in opposition to the search coils, as will be described in greater detail below.

The more detailed structural elements for assembling and supporting the members such as the coil form 24 and the case 18 and the like, may take any feasible form. Consequently, no description of such details of the structure is deemed necessary. Similarly, physical wiring elements such as terminals and wire pairs, etc., are only schematically and partially indicated in FIG. 2a–c.

The lower plug or tip portion 14 is fastened into the lower end of, and closes the interior space within the center of the lower case 29. Consequently, this acts to keep out borehole fluid while it provides a pointed tip as is usual for borehole logging instruments of this type.

Referring to FIG. 3 it is pointed out that the electrical circuit arrangement for this invention merely includes two pairs of coils that are connected in an air core magnetic induction coupled relationship as to the search transmitter-receiver coils 19, 17 and similarly as to the null transmitter-receiver coils 31, 32. However, as pointed out above, the latter pair are not magnetically coupled with the former, at all.

The search transmitter coil 19 is connected in series with the null transmitter coil 31, while the search receiver coil 17 is connected in series opposition to the null receiver coil 32. This provides for a substantially reduced output under standard conditions, i.e., when reading in the absence of any magnetic properties for the surrounding media. The purpose for this is to have a reduced amplitude output by reason of bucking out the major portion of the directly coupled signal, and thus to increase the sensitivity since changes in the output signal due to changes in the magnetic coupling will then be proportionately greater.

The operation of the system may be explained as follows. There is a source 44 of electric signal that is captioned "Osc. & Pwr. Amplifier" in the drawing. The same current flows through coils 19 and 31, inducing voltages in the receiver coils 17 and 32 respectively. The voltages induced in coils 17 and 32 are proportional to coil spacing, number of turns of wire, current flowing in the transmitter coils 19 and 31, the frequency, and the magnetic susceptibility, conductivity and dielectric constant of any material in proximity to the coil system. Coils 17 and 32 are connected in series opposition and the net voltage is a predetermined relatively small amplitude voltage when the tool is in air. This voltage is phase detected by having a phase sensitive detector 45 that is connected to the source 44 and the output of receiver coils 17 and 32, as clearly illustrated in FIG. 3. The phase detection discriminates against a conductivity signal and a portion of the signal due to dielectric constant.

When the tool containing the electrical system is placed in a borehole (with other variables being held constant) the voltage induced in coil 17 is changed due to the magnetic susceptibility of the surrounding media. However, because of the geometry of the null coils 31 and 32 the output of the coil 32 experiences negligible change in voltage. Consequently, the net change (input to detector 45 from coils 17 and 32) is due to the magnetic susceptibility of the formation, i.e., the borehole walls surrounding the tool near coils 19 and 17. It may be noted that dielectric constant effect is neglected because of the use of a low frequency.

The physical structure for the electrical arrangement will, of course, be carried out in accordance with good practice so that various of the connections will be shielded wires and terminal connectors may have electrostatic shields as needed, etc. A preferred embodiment for the coil structures and spacing of a laboratory size tool is as follows:

Search transmitter coil 19—2943 turns of wire, four inches long;

Search receiver coil 17—4672 turns of wire, four inches long;

Transmitter null coil 31—450 turns of wire (pancake shape);

Receiver null coil 32—1672 turns of wire (pancake shape);

Distance between search coils (between midpoints) is eight inches; and

Distance between null coils (between midpoints) is one and one-half inches.

The electrical and electronic equipment is kept to a minimum in the tool, but there is a space 48 (FIG. 2a) to accommodate a downhole amplifier (not shown) located between the top of coil form 24 and a head connector 50.

It is to be understood that the operation of an instrument according to this invention involves the measurement of magnetic susceptibility which is determined by changes in the flux linkages of the magnetic fields which exist and mutually interact between the search transmitter coil 19 and the search receiver coil 17. However, the changes in the induced voltage will be small compared to the total voltage so that there is a need for the nulling coils 31 and 32 to null out the voltage induced by direct coupling through the air. This will permit reliable detection of the small voltage variations. Furthermore, it is important to note that there is a substantial benefit in having the arrangement according to this invention, whereby the nulling coils are substantially unaffected by surrounding media, since these coils are flat pancake type and are located close together. Another benefit is gained because the null coils are located on the same logging instrument with the search coils. Because of this, they will be affected by the same conditions of temperature and general magnetism, e.g., earth's field, so that such conditions will constantly act both on the search coils and on the nulling coils, but in opposition. This means that they cancel one another and leave as the output signals only those desired which are caused by the magnetic susceptibility of the surrounding formation.

The foregoing and other objects and benefits of the invention are set forth above in considerable detail in accordance with the applicable statutes. However, this is not to be taken as in any way limiting the invention, but rather merely as being descriptive thereof.

We claim:
1. Borehole magnetic susceptibility logging apparatus comprising
   an elongated borehole logging tool having a longitudinal axis,
   a search transmitter coil located coaxially with said longitudinal axis,
   a search receiver coil located coaxially with said longitudinal axis and spaced a predetermined distance along said axis from said search transmitter coil to obtain a desired radial penetration of the electromagnetic field into the surrounding walls of the borehole,
   said tool having a non-magnetic material case,
   said search coils having outside diameters substantially the same as the inside diameter of said case,
   a receiver null coil having an outside diameter substantially equal to the outside diameters of said search coils and being subject to the same ambient conditions as said search coils and being connected in series with said search receiver coil and being located spaced along said longitudinal axis far enough to be outside the effective fields of said search coils,
   a transmitter null coil having an outside diameter substantially equal to the outside diameters of said search coils and being subject to the same ambient conditions as said search coils and being connected in series with said search transmitter coil and being located spaced along said longitudinal axis and located for direct magnetic coupling with said receiver null coil without any subtantial radial penetration of its electromagnetic field into the surrounding walls of the borehole, and
   circuit means for connecting said search and null coils together for providing signals indicating magnetic susceptibility of the borehole surrounding said logging tool.

2. Logging apparatus according to claim 1 wherein said null coils are pancake shape.

3. Logging apparatus according to claim 2 wherein both said search coils and said null coils are air core.

4. Logging apparatus according to claim 3 wherein said null coils are coaxial with one another and with said longitudinal axis.

5. Borehole magnetic susceptibility logging apparatus, comprising
   an elongated borehole logging tool having a longitudinal axis,
   an air core search transmitter coil located coaxially with said longitudinal axis,
   an air core search receiver coil located coaxially with said longitudinal axis spaced a predetermined distance along said axis from said search transmitter coil to obtain a desired radial penetration of the electromagnetic field into the surrounding walls of the borehole,
   said tool having a non-magnetic material case,
   said search coils having outside diameters substantially the same as the inside diameter of said case,
   an air core receiver null coil connected in series opposition with said search receiver coil and located coaxially and spaced along said longitudinal axis far enough to be outside the effective fields of said search coils,
   an air core transmitter null coil connected in series with said search transmitter coil and located coaxially with for direct magnetic coupling with and close to said receiver null coil without any substantial radial penetration of the magnetic fields into the surrounding walls of the borehole,
   both said null coils having outside diameters substantially equal to the outside diameters of said search coils and being subject to the same ambient conditions as said search coils, and
   circuit means for connecting said search and null coils together for providing signals indicating magnetic susceptibility of the borehole surrounding said logging tool.

References Cited

UNITED STATES PATENTS

| | | | |
|---|---|---|---|
| 2,850,707 | 9/1958 | Wroblewsi et al. | 336—232X |
| 3,058,078 | 10/1962 | Hoh | 336—232X |
| 3,094,658 | 6/1963 | Bravenec et al. | 324—6 |
| 3,112,443 | 11/1963 | Buckner, Jr. | 324—6 |
| 3,327,203 | 6/1967 | Attali | 324—6 |
| 3,419,834 | 12/1968 | McKechnie et al. | 336—232X |
| 2,451,596 | 10/1948 | Wheeler | 324—3 |
| 2,680,226 | 6/1954 | Whitehead et al. | 324—3 |
| 2,788,483 | 4/1957 | Doll | 324—6 |
| 2,807,777 | 9/1957 | Doll | 324—3 |
| 3,051,892 | 8/1962 | Huston | 324—6 |
| 3,052,837 | 9/1962 | Arbogast et al. | 324—3 |
| 3,065,407 | 11/1962 | Huddleston, Jr. et al. | 324—6 |
| 3,067,383 | 12/1962 | Tanguy | 324—6 |
| 3,108,220 | 10/1963 | Ruddock | 324—6 |
| 3,226,633 | 12/1965 | Schneider | 324—6 |
| 3,329,889 | 7/1967 | Tanguy | 324—1 |

GERARD R. STRECKER, Primary Examiner